(12) United States Patent
Alexander

(10) Patent No.: US 6,708,791 B2
(45) Date of Patent: Mar. 23, 2004

(54) SNOW VEHICLE

(76) Inventor: James L. Alexander, 205 Geiger Rd., Niles, MI (US) 49120

( * ) Notice: Subject to any disclaimer, the term of this patent is extended or adjusted under 35 U.S.C. 154(b) by 0 days.

(21) Appl. No.: 10/375,944

(22) Filed: Feb. 27, 2003

(65) Prior Publication Data

US 2003/0159868 A1 Aug. 28, 2003

Related U.S. Application Data

(60) Provisional application No. 60/360,525, filed on Feb. 27, 2002, provisional application No. 60/368,824, filed on Apr. 1, 2002, and provisional application No. 60/368,825, filed on Apr. 1, 2002.

(51) Int. Cl.$^7$ .................. B60M 27/02; B62B 13/08; B62D 55/104
(52) U.S. Cl. .................. 180/182; 180/184; 180/192; 180/193; 280/124.1
(58) Field of Search .................. 180/190, 182, 180/186, 184, 189, 192; 280/124.1, 16, 17, 21.1, 22, 22.1, 606, 608

(56) References Cited

U.S. PATENT DOCUMENTS

| | | | | |
|---|---|---|---|---|
| 3,077,238 A | * | 2/1963 | Nelson | 180/192 |
| 3,756,334 A | * | 9/1973 | Williams | 180/192 |
| 3,827,516 A | * | 8/1974 | Lucia | 280/22.1 |
| 4,671,521 A | * | 6/1987 | Talbot et al. | 280/16 |
| 4,826,184 A | * | 5/1989 | Kuehmchel et al. | 280/21.1 |
| 5,474,146 A | | 12/1995 | Yoshioka | 180/184 |
| 5,660,245 A | * | 8/1997 | Marier et al. | 180/190 |
| 5,730,242 A | * | 3/1998 | Furusawa | 180/193 |
| 5,860,486 A | * | 1/1999 | Boivin et al. | 180/193 |
| 6,095,275 A | * | 8/2000 | Shaw | 180/185 |
| 6,199,649 B1 | * | 3/2001 | Alanko | 180/190 |
| 6,321,864 B1 | * | 11/2001 | Forbes | 180/193 |
| 6,343,666 B1 | * | 2/2002 | Olson et al. | 180/182 |

OTHER PUBLICATIONS

Kaduce, Larry, *Le Futur Est Proche*, snowconnection.com, Nov. 21, 1999.
Snowhawk specification, untitled document, Jun. 4, 2002.

* cited by examiner

Primary Examiner—Lesley D. Morris
Assistant Examiner—Tony Winner
(74) Attorney, Agent, or Firm—Marshall, Gerstein & Borun LLP

(57) ABSTRACT

A snow vehicle includes a frame having a longitudinal axis, a pair of rear suspension assemblies, a pair of front suspension assemblies, a pair of drive tracks, and a pair of ski assemblies. Each rear suspension assembly pivotally connects a drive track to a rearward portion of the frame. Each front suspension assembly pivotally connects a ski assembly to a forward portion of the frame. The rear suspension assemblies, the front suspension assemblies, the drive tracks, and the ski assemblies are symmetric about the longitudinal axis.

24 Claims, 8 Drawing Sheets

SNOW VEHICLE

RELATED APPLICATIONS

This application claims priority from U.S. Provisional Application Ser. No. 60/360,525, filed Feb. 27, 2002; U.S. Provisional Application Ser. No. 60/368,824, filed Apr. 1, 2002; and, U.S. Provisional Application Ser. No. 60/368, 825, filed Apr. 1, 2002, the disclosures of which are incorporated herein by reference.

FIELD OF THE INVENTION

This disclosure relates generally to all terrain vehicles, and more particularly, to a snow vehicle.

BACKGROUND OF THE INVENTION

Snowmobiles are typically used for recreation. In geographical areas where snow and ice dominate the landscape for a large part of the year, snow mobiles and other snow vehicles are also used for transportation. In particular, such vehicles are often used to traverse terrain that is beyond the capabilities of automobiles, trucks and all terrain vehicles.

Snow mobiles typically have a pair of skis that mounted on opposite sides of the snow mobile's body. Snow mobiles also include a seat that accommodates one or more riders in an upright manner. To propel the snow mobile, a single track is typically disposed in the rear portion of the snow mobile, which receives power from a motor. Both the skis and the track are connected to the snowmobile's main body by front and rear suspensions, respectively.

DETAILED DESCRIPTION

Figure 1A:
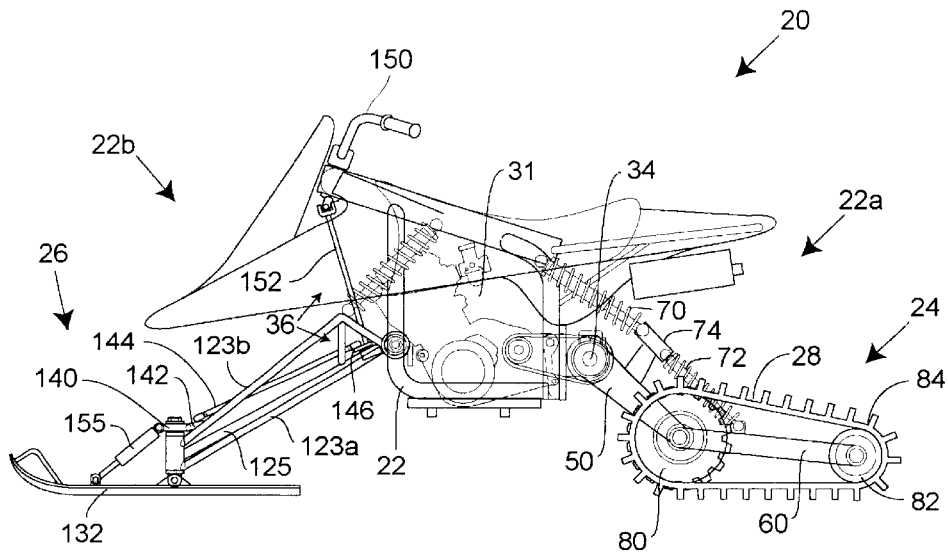
FIGS. 1A and 1B are side and top views, respectively, of a snow vehicle assembled in accordance with the teachings of a first disclosed example of the present invention.
Figure 1B:
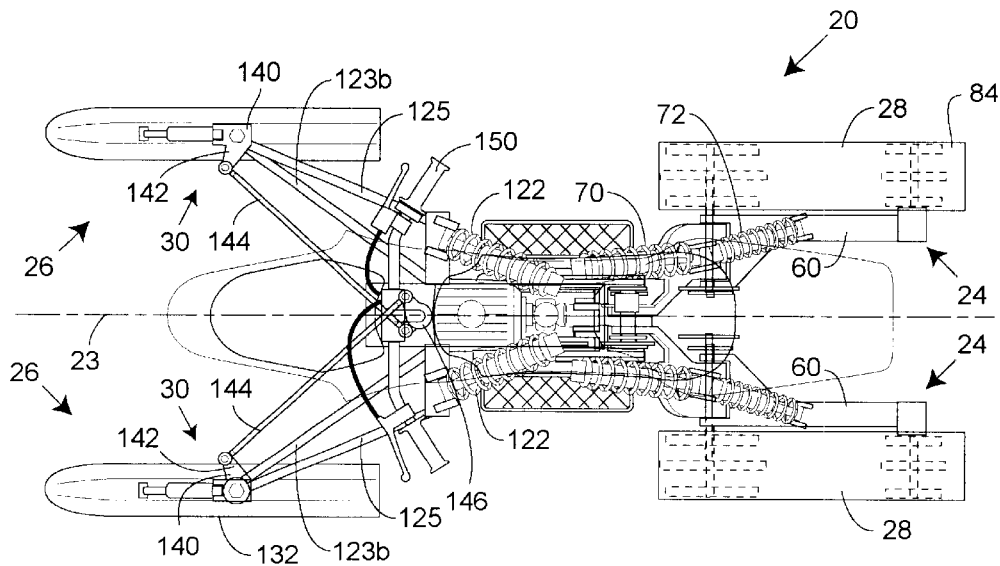

Referring to FIGS. 1A and 1B, a snow vehicle 20 in accordance with the teachings of the present disclosure is shown. In the following, a "normal operation" refers to an operating condition where the snow vehicle 20 is under a typical load, and the terrain on which the snow vehicle 20 is traveling is flat. The snow vehicle 20 includes a frame 22 having a longitudinal axis 23 (shown in FIGS. 3 and 4), and which longitudinal axis 23 extends generally parallel to the ground and generally parallel to a direction of travel during straight line and normal operation of the snow vehicle 20. The snow vehicle 20 also includes a pair of rear suspension assemblies 24, a pair of front suspension assemblies 26, a pair of drive tracks 28 and a pair of ski assemblies 30. Each rear suspension assembly 24 pivotally connects a drive track 28 to a rearward portion 22a of the frame 22. Each front suspension assembly 26 pivotally connects a ski assembly 30 to a forward portion 22b of the frame 22. The snow vehicle 20 may also include a motor 31 mounted to the frame and used for driving a drive output 34, which is operatively connected to the drive tracks 28. The snow vehicle 20 also includes a steering assembly 36 that is operatively connected to the ski assemblies 30 preferably and generally provides steering of the snow vehicle 20. The rear suspension assemblies 24, the front suspension assemblies 26, the drive tracks 28, and the ski assemblies 30 are symmetric about the longitudinal axis 23. Accordingly, when describing each of the above-noted assemblies in the following, only the portion or portions of the respective assemblies disposed on one side of the longitudinal axis 23 need be described in detail, it being understood that the portion or portions of the respective assemblies disposed on the other side of the longitudinal axis 23 are substantially similar if not identical.

Figure 2:
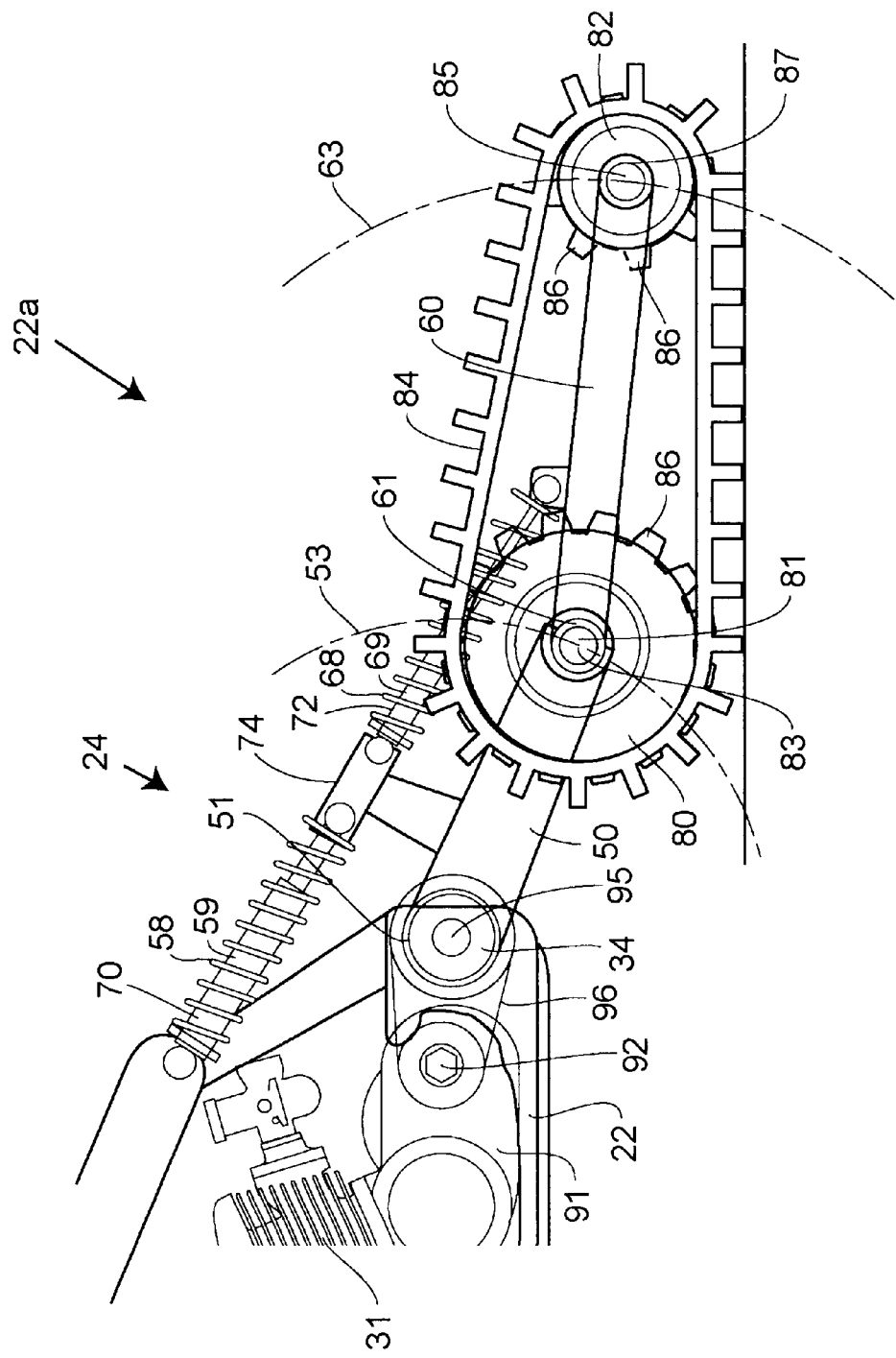
FIG. 2 is a fragmentary side elevational view of a rear portion of the snow vehicle of FIGS. 1A and 1B.
Figure 3:
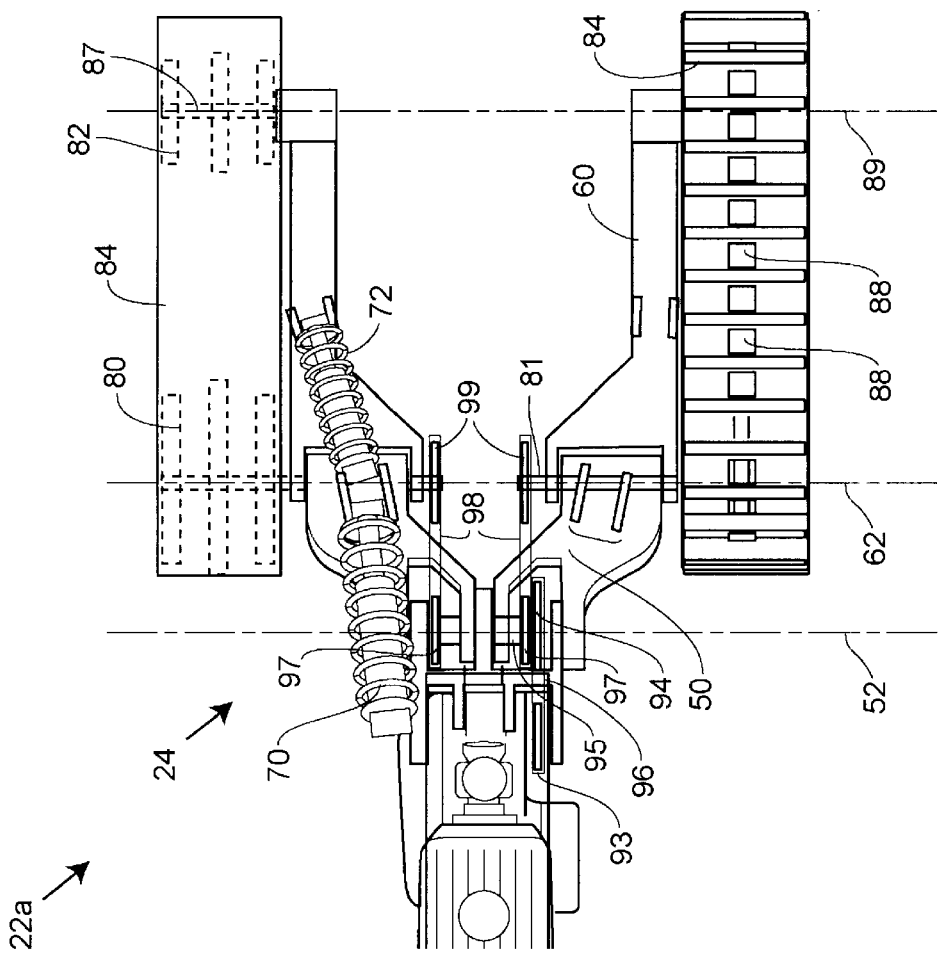
FIG. 3 is a fragmentary top plan view of the rear portion of the snow vehicle of FIGS. 1A and 1B.
Figure 10:
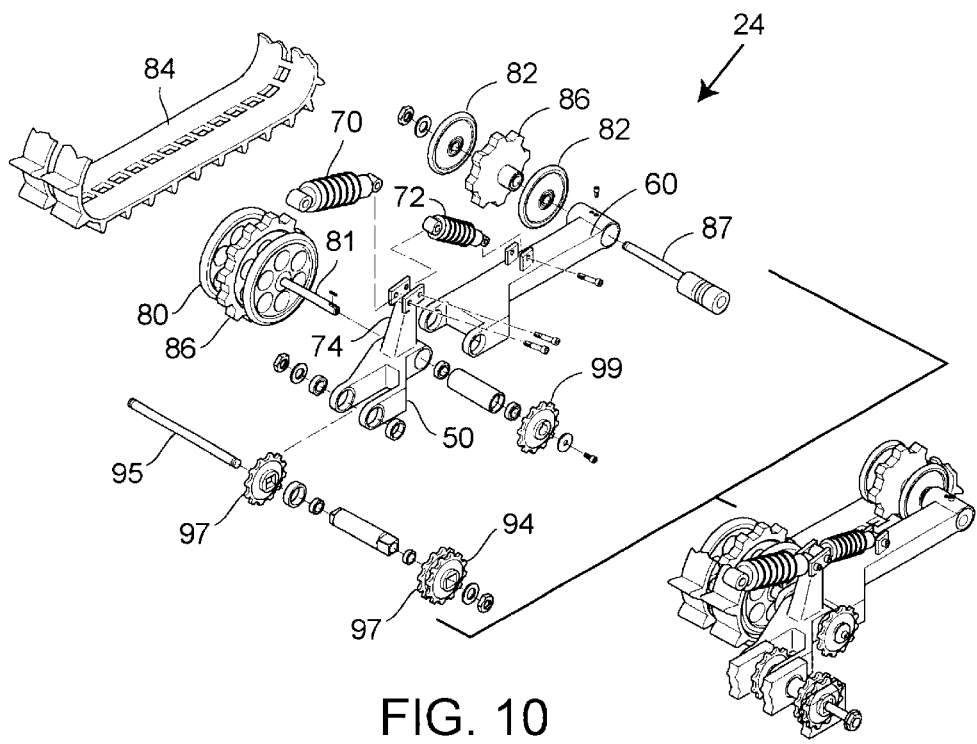
FIG. 10 is a perspective exploded fragmentary view of the rear portion of the snow vehicle of FIGS. 1A and 1B.
Figure 11:
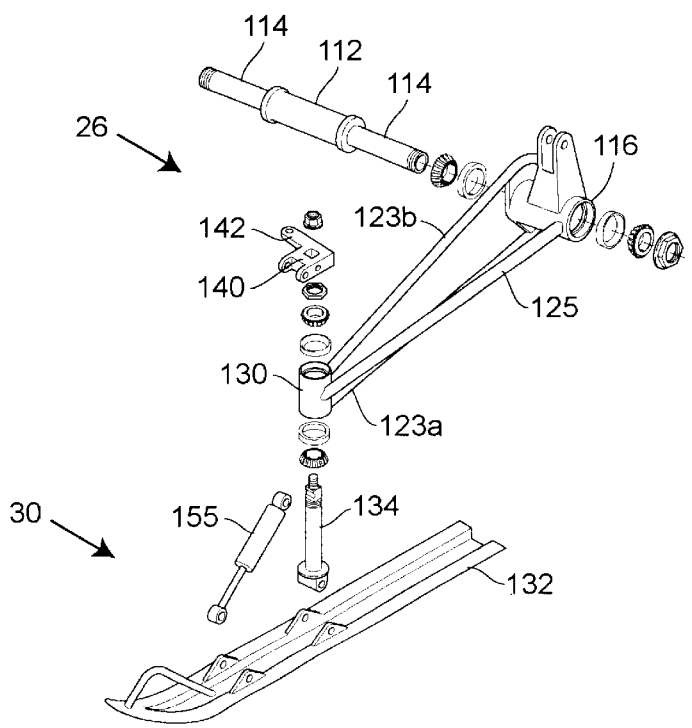
FIG. 11 is a perspective exploded fragmentary view of the front portion of the snow vehicle of FIGS. 1A and 1B.

Referring to FIGS. 2, 3 and 10, the rear suspension assembly 24 is shown in more detail. Each rear suspension assembly 24 includes a first link arm 50 that is connected to the frame 22 at a first pivot 51 having a first pivot axis 52 (shown in FIG. 3). Accordingly, the first link arm 50 pivots relative to the frame 22 at the first pivot 51 and about the first pivot axis 52 as shown by the arc 53 (shown in FIG. 2). A second link arm 60 is connected to the first link arm 50 at a second pivot 61 having a second pivot axis 62 (shown in FIG. 3). Accordingly, the second link arm 60 and the first link arm 50 pivot relative to each other at the second pivot 61 and about the second pivot axis 62 as shown by the arc 63 (shown in FIG. 2).

The first link arm 50 is biased downwardly by a first spring 58, which extends between the first link arm 50 and the frame 22. The second link arm 60 is biased downwardly by a second spring 68, which extends between the second link arm 60 and the first link arm 50. In the disclosed example, in order to dampen the pivoting of the first link arm 50 about the first pivot axis 52, a first shock absorber 59 extends between the first link arm 50 to the frame 22. Also, in order to dampen the pivoting of the second link arm 60 about the second pivot axis 62, a second shock absorber 69 extends between the second link arm 60 and the first link arm 50. One of ordinary skill in the art will appreciate that the first spring 58 and the first shock absorber 59 can be coaxial to form a first strut 70, and the second spring 68 and the second shock absorber 69 can be coaxial to form a second strut 72. Accordingly, the first strut 70 extends between the first link arm 50 and the frame 22, and the second strut 72 extends between the second link arm 60 and the first link arm 50. In the disclosed example, the first link arm 50 includes a bracket 74, to which the first strut 70 and the second strut 72 are pivotally connected. The bracket 74 is fixedly attached to a center portion of the first link arm 50 and extends upward and transverse relative to the first link arm 50. The bracket 74 may take any suitable shape, such as a T-shape, an L-shape, etc.

Each drive track 28 includes a front wheel 80 and a rear wheel 82 that are operatively coupled together by a drive belt 84. The rotational axis of the front wheel 80 is aligned with the second pivot axis 62, and therefore, the front wheel 80 rotates about the second pivot axis 62. In the disclosed example, the front wheel 80 is attached to and supported by a front spindle 81 that is rotationally mounted inside a front bore 83 running through the second pivot 61 and being concentric therewith. The front bore 83 may include one or more bearings to provide free rotation of the front spindle 81 inside the front bore 83.

One of ordinary skill in the art will readily appreciate that numerous well known alternate structures can be used for providing rotation of the front wheel 80 about the first pivot axis 52. For example, the front spindle 81 may be fixed to the second pivot 61 so that it cannot rotate about the second pivot axis 62 (not shown). Accordingly, the front wheel 80 can rotate about the spindle 81, while the spindle 81 remains fixed to the second pivot 61. One or more bearings disposed between the front wheel 80 and the front spindle 81 can then provide free rotation of the front wheel 80 about the front spindle 81.

The second link arm 60 includes a rear bore 85 at its rear end for supporting a rear spindle 87 (shown in FIG. 3). The rear wheel 82 is mounted on and support by the rear spindle 87. The rotational axis of the rear wheel 82 is aligned with a rear bore axis 89, which is parallel with the second pivot axis 62. The rear bore 85 may include one or more bearings to provide free rotation of the rear spindle 87 inside the rear bore 85. One of ordinary skill in the art will readily appreciate that numerous well known alternate structures can be used for providing rotation of the rear wheel 82 about the rear bore axis 89. For example, the rear spindle 87 may be fixed to the rear bore 85 so that it cannot rotate about rear bore axis 89. Accordingly, the rear wheel 82 can rotate about the rear spindle 87, while the rear spindle 87 remains fixed to the rear bore 85. One or more bearings disposed between the rear wheel 82 and the rear spindle 87 can then provide free rotation of the rear wheel 82 about the rear spindle 87.

The drive belt 84 engages the front wheel 80 and the rear wheel 82 to rotationally couple the front wheel 80 with the rear wheel 82. Furthermore, portions of the external periphery of the drive belt 84 contact the ground to propel the snow vehicle 20 by converting the rotational motion of the front wheel 80 and the rear wheel 82 to the linear or rotational motion of said portions. One of ordinary skill in the art will readily appreciate the numerous well known methods by which the drive belt 84 can operatively engage the front wheel 80 and the rear wheel 82. For example, the drive belt 84 can be tensioned to frictionally engage the outer peripheries of the front wheel 80 and the rear wheel 82. However, in the disclosed example, the outer peripheries of the front wheel 80 and the rear wheel 82 include cogs 86 that engage correspondingly sized apertures 88 (shown in FIG. 3) in the drive belt 84 to secure a non-slip engagement between the front wheel 80, the rear wheel 82 and the drive belt 84.

The drive belt 84 can alternately include grooves (not shown) on its internal periphery instead of the apertures 88 that can be sized to engage correspondingly sized teeth on the front wheel 80 and the rear wheel 82. To provide adequate operational coupling of the front wheel 80 and the rear wheel 82 with the drive belt 84, the front wheel 80 and the rear wheel 82 can be at least as wide as the drive belt 84 (not shown). However, in the disclosed example, the front wheel 80 and the rear wheel 82 are formed from a number of concentrically connected smaller wheels that collectively have a width equal to that of the drive belt 84. Referring to FIG. 2, the front wheel 80 and the rear wheel 82 are shown as each being composed of three such smaller width wheels.

To propel the snow vehicle 20, at least one of the front wheel 80 or the rear wheel 82 can be driven by the drive output 34. In the disclosed example, the front wheel 80 is driven by the drive output 34. The drive output 34 transmits the power generated by the motor 31 to the front wheel 80. Such drive output mechanisms are well known to those of ordinary skill as they are used in vehicles such as motorcycles and snow mobiles. For example, the drive output mechanism can be a shaft that transfers the rotational motion of a crankshaft (not shown) of the motor 31 to the front wheel 80, i.e., shaft drive. One of ordinary skill in the art will also appreciate that the drive output 34 may also include a torque and/or speed converting mechanism to reduce or increase the torque and speed of the motor 31 before being transmitted to the front wheel 80. In the disclosed example, the motor 31 is operatively coupled to a gearbox 91. The gearbox 91 includes a number of user-selectable gears that reduce or increase the torque and/or speed of the motor 31. The gearbox 91 is the type typically used for motorcycles, where the rider selects the different gears with a foot pedal (not shown). Referring to FIG. 3, the gearbox 91 includes an output shaft (not shown) having an output gear 93 attached thereto. The output gear 93 is operatively connected to a drive gear 94 of a drive shaft 95 by a first chain 96. Accordingly, rotation of the output gear 93 causes rotation of the drive shaft 95. The drive shaft 95 further includes two transfer gears 97 symmetrically disposed on the drive shaft 95 relative to the longitudinal axis 23. Each transfer gear 97 is operatively coupled by a drive chain 98 to a driven cog 99 of the front wheel 80. The driven cog 99 is attached to the front spindle 81 and rotationally drives the spindle 81 to thereby rotate the front wheel 80. Thus, rotation of the drive shaft 95 causes the rotation of each of the driven cogs 99, to thereby drive the front wheels 80. The drive shaft 95 is aligned with the first pivot axis 52, so that the pivoting of the first link arm 50 about the first pivot axis 52 has no effect on the drive chain 98 or any parts of the foregoing coupling mechanism for transferring power from the motor 31 to the front wheels 80.

The power transfer from the motor 31 to the front wheels 80 as described in the foregoing can also be accomplished by other mechanisms and methods that are well known to those of ordinary skill in the art. For example, drive belts can be alternately used instead of the first chain 96 and the drive chains 98. In another example, a number of drive shafts and power transfer gear structures (i.e., a number of operatively connected helical or beveled gears) can be used to drive the front wheels 80 with the motor 31.

Figure 7:
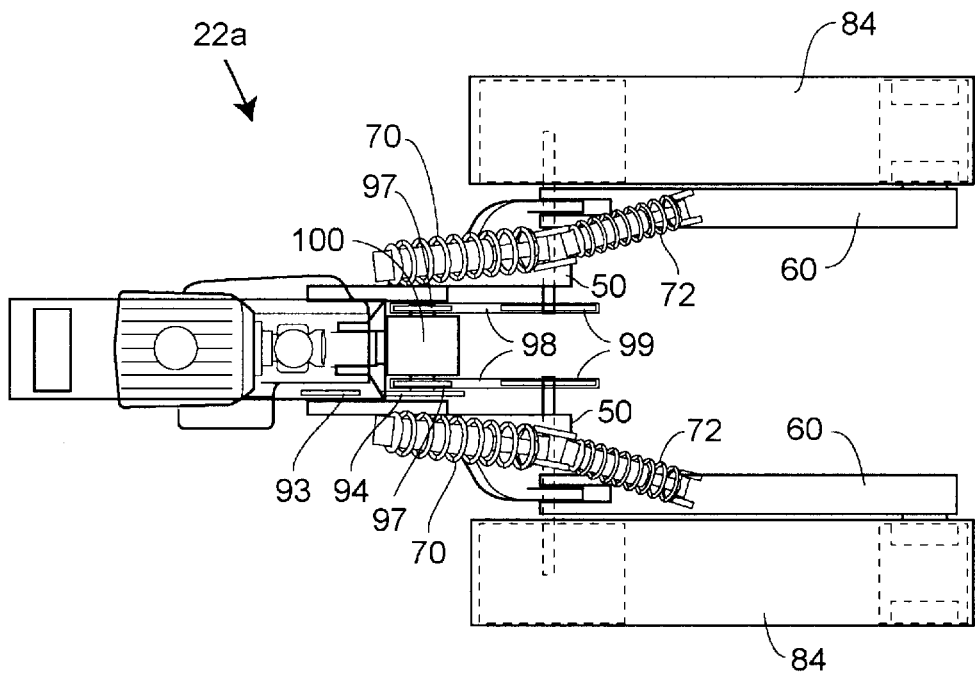
FIG. 7 is a fragmentary top plan view of the rear portion of the snow vehicle in accordance with the teachings of a second disclosed example of the present invention.

Because the drive belts 84 of the snow vehicle 20 will move at different speeds when the snow vehicle 20 is turning, the snow vehicle can include a differential 100 (shown in FIG. 7) that is operatively disposed between the drive gear 94 and the transfer gears 97. Accordingly, the rotation of the drive gear 94 is transferred to the differential 100 and then distributed to the transfer gears 97. The differential 100 is similar to those used in automobiles and is well known to those of ordinary skill in the art.

Figure 8A:
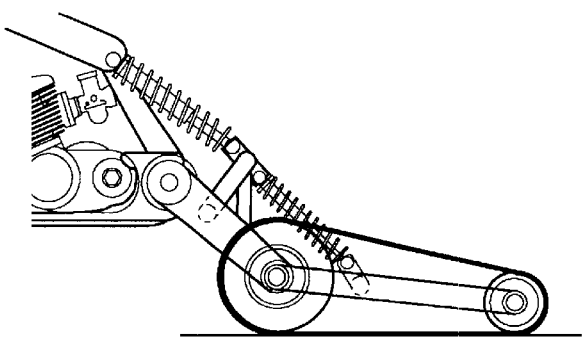
FIGS. 8A–8D are exemplary operational configurations of the rear portion of the snow vehicle of FIGS. 1A and 1B.
Figure 8B:
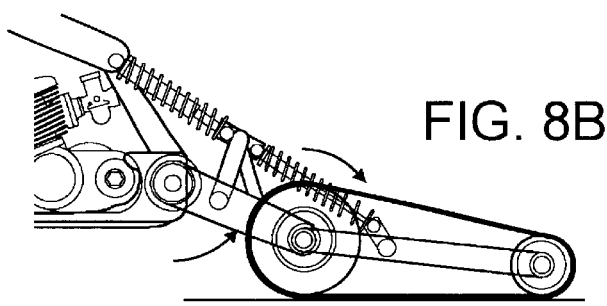
Figure 8C:
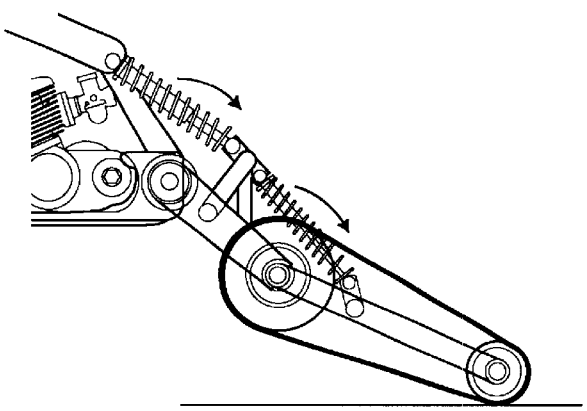
Figure 8D:
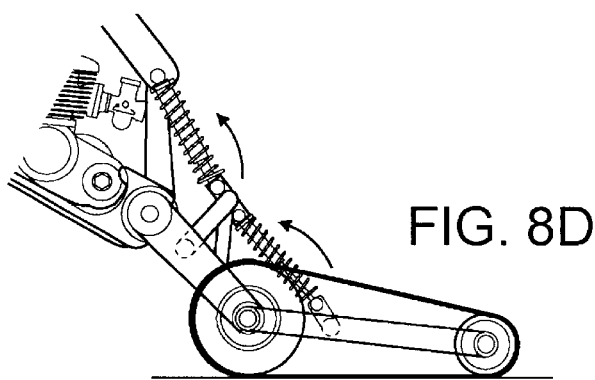

Referring to FIGS. 8A–8D, the first strut 70 and the second strut 72 can extend and compress by a wide range within their operational limits. Accordingly, the rear assembly 24 of the snow vehicle 20 can adapt to numerous terrain and loading conditions by having the first strut 70 and the second strut 72 extend or compress as necessary. Several exemplary operational configurations of the rear suspension assembly 24 are shown in FIGS. 8A–8D. In FIG. 8A, the rear suspension assembly is shown in an exemplary normal load condition, which may be a condition where the snow vehicle 20 is traversing a near flat terrain. Under such normal conditions, the first strut 70 and the second strut 72 compress or extend as necessary depending on the load carried by the snow vehicle 20 or unevenness in the terrain. FIG. 8B shows a second exemplary operational condition of the snow vehicle 20 where the first strut 70 is compressed and the second strut 72 is extended. Such an operational condition may occur when the snow vehicle is heavily loaded, or when the front of the snow vehicle 20 is at a lower elevation than the rear of the snow vehicle 20, and the snow vehicle 20 is oriented substantially horizontal. FIG. 8C shows a third exemplary operational condition of the snow vehicle 20 where the first strut 70 and the second strut 72 are both extended. Such an operational condition may occur when the front of the snow vehicle 20 is at a higher elevation than the rear of the snow vehicle 20, and the snow vehicle 20 is oriented substantially horizontal. FIG. 8D shows a fourth operational condition of the snow vehicle where the first strut 70 and the second strut 72 are both compressed. Such an operational condition may occur when the front of the snow vehicle 20 is at a higher elevation that the rear of the snow vehicle 20, and the snow vehicle 20 is oriented at a slope (e.g., the snow vehicle 20 climbing a sloped terrain). Numerous other operational configurations of the snow vehicle 20 other than those described in the foregoing are possible. One of ordinary skill in the art will appreciate that the front strut 70 and the rear strut 72 can independently extend or compress within their operational limits, and as necessary, to maintain the drive belt 84 in contact with the ground when the snow vehicle 20 encounters a variety of terrains.

Figure 4:
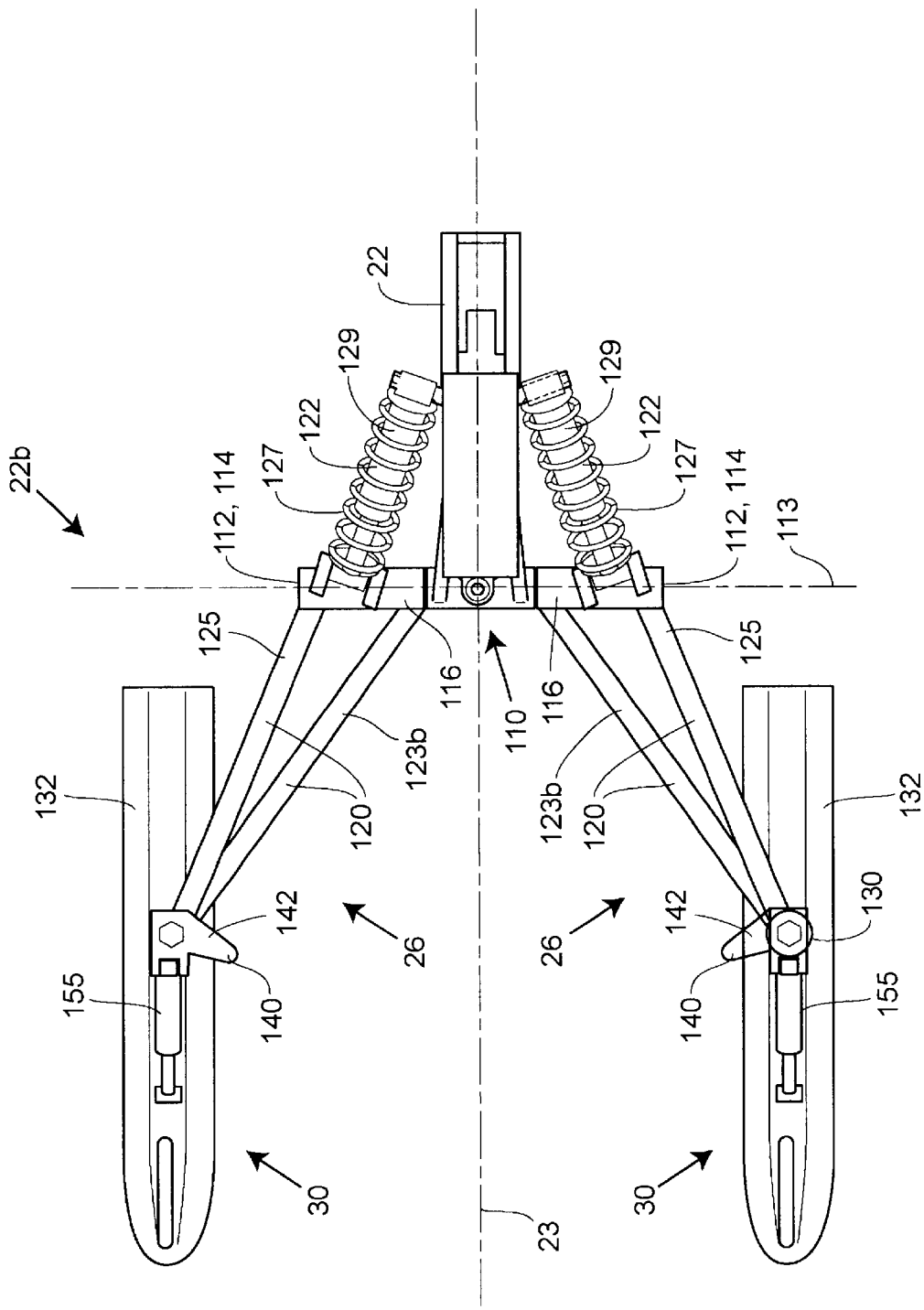
FIG. 4 is a fragmentary top plan view of a front portion of the snow vehicle of FIGS. 1A and 1B.
Figure 5:
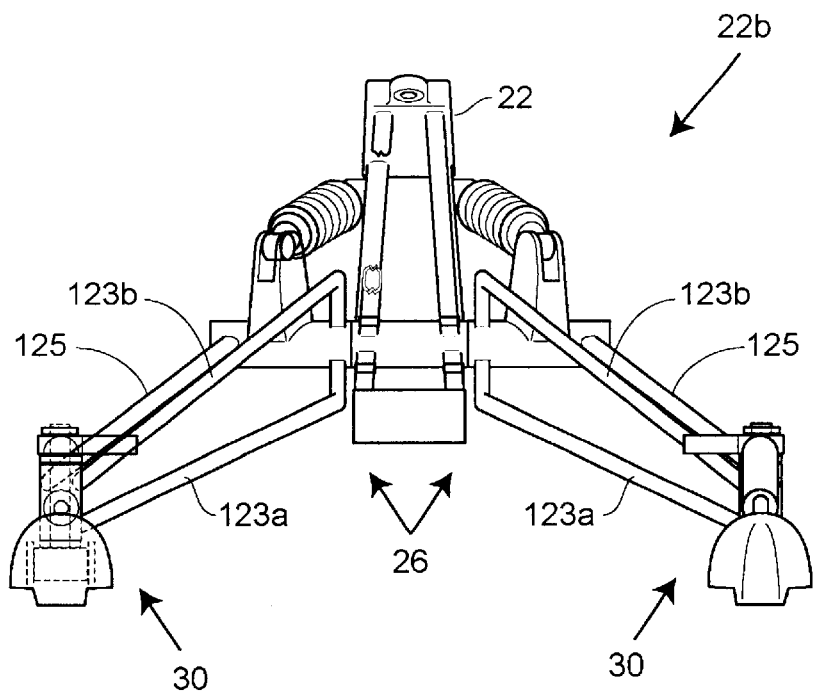
FIG. 5 is a fragmentary front elevational view of the front portion of the snow vehicle of FIGS. 1A and 1B.
Figure 6:
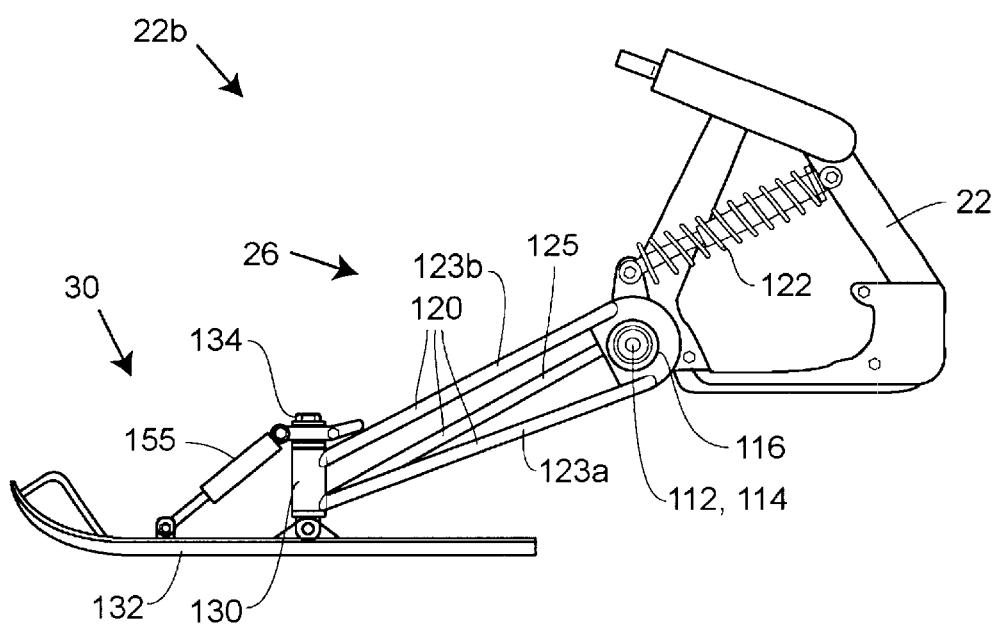
FIG. 6 is a fragmentary side elevational view of the front portion of the snow vehicle of FIGS. 1A and 1B.
Figure 9:
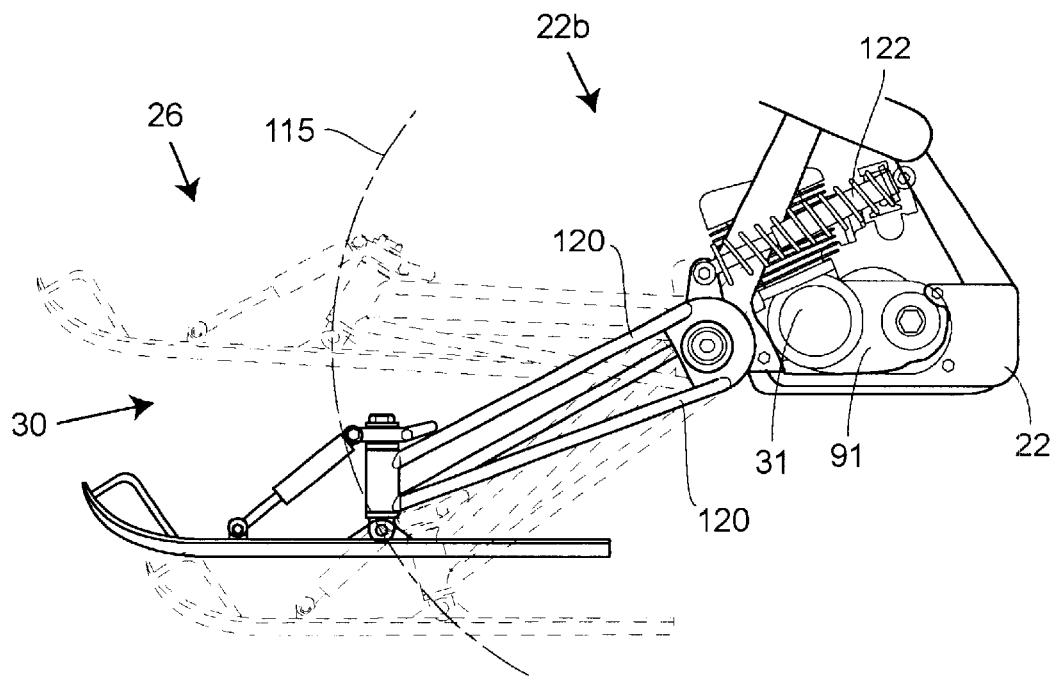
FIG. 9 is a side view of a front portion of the snow vehicle of FIGS. 1A and 1B, showing an exemplary operational configuration of the front portion.

Referring to FIGS. 4–6, 9 and 11, the front suspension assembly 26 is shown in more detail. The front suspension assembly 26 includes a central pivot hub 110 that is perpendicular to the longitudinal axis 23 and generally parallel to the ground in normal operation. The central pivot hub 110 includes a shaft 112 that is attached to the frame 22. The shaft is generally perpendicular to and symmetric about the longitudinal axis 23. Accordingly, the ends of the shaft 112 define two equally sized spindles 114. Each spindle 114 supports a collar 116 that freely rotates about a horizontal pivot axis 113 defined by the spindle 114. Each collar 114 is connected to a ski assembly 30 by a swing arm 120. One of ordinary skill in the art will appreciate that the swing arm 120 may be sized and configured (e.g., have more than one arm member as shown in FIGS. 4–6) to provide adequate structural support for the ski assembly 30. In the disclosed example, the swing arm 120 includes a pair of inner suspension arm 123a and 123b and an outer suspension arm 125. The free rotation of the collar 116 about the spindle 114 provides for movement of each ski assembly 30 in an arc 115 as shown in FIG. 9.

The collar 116 is pivotally connected to the frame 22 by a front strut 122, which biases the ski assembly 30 downward. The strut 122, which may be directly mounted to the frame 22 includes a spring 127 and a shock absorber 129. The strut 122 also dampens and limits the movement of the ski assembly 30. One of ordinary skill in the art will appreciate that various well known alternate structures for dampening and limiting the movement of the ski assembly 30 may be used in place of or in addition to the strut 122. For example, the shaft 112 may be a torsion bar (not shown) to which the collars 116 can be fixedly attached. Accordingly, the torsional rigidity of the shaft 112 (i.e. resistance of the shaft 112 to twisting) can bias the ski assembly 30 downward and dampen and limit the movement of the ski assembly 30. However, a strut 122 can also be provided as described in the foregoing to supplement the shaft 112 in the downward biasing, dampening, and limiting the movement of the ski assembly 30.

The ski assembly 30 includes a ski hub 130 that is attached to the swing arm 120. The ski assembly 30 further includes a ski 132 that includes a ski shaft 134 perpendicularly attached thereto. The ski shaft 134 is housed in the ski hub 130 and freely rotates therein. Accordingly, to steer the snow vehicle 20, the ski 132 can be rotated in a plane that is generally perpendicular to the ski hub 130.

Referring to FIGS. 1A, 1B, and 4, a steering knuckle 140 is attached to the upper part of the ski shaft 134 and above the ski hub 130. The steering knuckle 140 includes a tab 142 that extends laterally relative to the ski 132 and inwardly towards the longitudinal axis 23. Each tab 142 is pivotally connected to a tie rod 142. A steering wish bone 146, which is pivotally attached to the frame 22, pulls and pushes the tie rod 144, which in turn pulls and pushes on the steering knuckle 140 to steer the ski 132. The steering wish bone 146 is attached to a central and forward portion of the frame 22. One of ordinary skill in the art will appreciate that for symmetrical steering of the skis 132, the steering wish bone 146 can be pivotally attached to a forward portion of the frame 22 along the longitudinal axis 23. Accordingly, in the disclosed example, the steering wish bone 146 is pivotally attached to the frame 22 along the longitudinal axis 23 and above and near where the shaft 112 of the central pivot hub 1110 is attached to the frame 22. The snow vehicle 20 includes a steering input device, such as a handle bar 150 for user control of steering. The handle bar 150 is operatively connected to a steering column 152, which is connected to the steering wishbone 146. Thus, rotation of the handle bar 150 is transferred to the steering wishbone 146 by the steering column 152. The steering wishbone 146 pushes one of the tie rods 142 and equally pulls the other tie rod 142 to steer the skis 132 synchronously. To absorb vibration and sudden movements of the skis 132, the steering knuckle 140 is pivotally connected to a forward portion of the ski 132 by a shock absorber 155.

As described in the foregoing, the rear suspension assemblies 24 and the front suspension assemblies 26 are symmetric about the longitudinal axis 23. Furthermore, each rear suspension assembly 24 operates independent of the other suspension assembly 24, and each front suspension assembly 26 operates independent of the other front suspension assembly 26. Accordingly, such independent front and rear suspension assembly configuration allows the snow vehicle 20 to traverse a variety of terrain. For example, each rear suspension assembly 24 can operate under one of the conditions shown in FIGS. 8A–8D independent of the other rear suspension assembly 24. In other words, while one rear suspension assembly 24 is operating under one of the conditions shown in FIGS. 8A–8D, the other rear suspension assembly 24 can be operating under one of the other three operating conditions. Similarly, the pivoting of each front suspension assembly 24, as shown in FIG. 9, is independent of the other front suspension assembly 26. Thus, the snow vehicle 20 is capable of traversing a variety of terrain under various loading conditions by having each of the rear suspension assemblies 24 and each of the front suspension assemblies 26 operate independent of each other.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A snow vehicle comprising:

a frame;

a pair of drive tracks;

each of the drive tracks operatively connected to a rearward portion of the frame by a rear suspension assembly, each rear suspension assembly arranged to permit the attached drive track to pivot independently relative to the frame about a first pivot axis and a second pivot axis, the first and second pivot axis spaced apart and oriented transversely relative to a longitudinal axis of the frame;

a pair of front ski assemblies; and each of the front ski assemblies operatively connected to a forward portion of the frame by a front suspension, the front suspension arranged to permit each of the front ski assemblies to pivot independently about a common hub.

2. The snow vehicle of claim 1, wherein each rear suspension assembly further includes a first link arm pivotally connected to the frame and pivotal about the first pivot axis, and a second link arm pivotally connected to the first link arm and pivotal about the second pivot axis.

3. The snow vehicle of claim 1, including a first spring engaging the frame and the first link arm and arranged to bias the first link arm downwardly, and including a second spring engaging the first link arm and the second link arm and arranged to bias the second link arm downwardly.

4. The snow vehicle of claim 1, wherein each drive track includes a drive belt supported by a front wheel and a rear wheel.

5. The snow vehicle of claim 4, including a drive output mounted to the frame, and wherein at least one of the wheels is a driven wheel operatively connected to the drive output.

6. The snow vehicle of claim 4, wherein the front wheel rotates about the first pivot axis.

7. The snow vehicle of claim 1, wherein the first link arm includes a forward end pivotally connected to the frame at the first pivot axis, and wherein the second link arm includes a forward end pivotally connected to a rearward end of the first link arm at the second pivot axis, and including a first spring operatively engaging a central portion of the first link arm and the frame and arranged to bias the first link arm in a ground engaging direction about the first pivot axis, and including a second spring operatively engaging a central portion of the first link arm and the second link arm and arranged to bias a rearward end of the second link arm in a ground engaging direction about the second pivot axis.

8. The snow vehicle of claim 7, including a first shock absorber for dampening rotation of the first link arm about the first pivot axis, and a second shock absorber for dampening rotation of the second link arm about the second pivot axis.

9. The snow vehicle of claim 1, wherein the first link arm includes a forward end connected to the frame for rotation about the first pivot axis, and wherein the second link arm is connected to the first link arm for rotation about the second pivot axis, the first link arm including a central mounting bracket, and including a first spring engaging the frame and the mounting bracket of the first link arm and arranged to bias the first link arm about the first pivot axis in a ground engaging direction, and including a second spring engaging the central mounting bracket and the second link arm and arranged to bias the second link arm in a ground engaging direction about the second pivot axis.

10. The snow vehicle of claim 1, including a rotational drive output mounted to the frame and arranged to transmit power from an engine, the drive output positioned on the frame to rotate about the first pivot axis.

11. The snow vehicle of claim 10, wherein each drive track includes a driven cog rotatable about the second pivot axis, the driven cog connected to the drive output by a drive chain.

12. A snow vehicle comprising:

a frame;

a drive motor;

a drive output;

a rear drive track operatively connected to the drive output;

a rear suspension system operatively connecting the frame and the rear drive track, the rear suspension system including:

a first arm having a forward end connected to the frame and pivotable about a first pivot axis, a second arm connected to a rearward end of the first arm and pivotable about a second pivot axis, the second pivot axis moveable along a generally arc-shaped path in response to pivotal movement of the first arm about the first pivot axis;

a first biasing component engaging the first arm and the frame and arranged to bias the rearward end of the first arm in a ground engaging direction about the first pivot axis; and a second biasing component engaging the second arm and at least one of the first arm and the frame and arranged to bias a rearward end of the second arm in a ground engaging direction about the second pivot axis.

13. The snow vehicle of claim 12, wherein the first and second pivot axes are generally horizontal and oriented generally transversely relative to a longitudinal axis of the frame.

14. The snow vehicle of claim 12, wherein the first arm includes a central bracket, a rearward end of the first biasing component and a forward end of the second biasing component mounted to the central bracket of the first arm.

15. The snow vehicle of claim 14, wherein the central bracket of the first arm is a T-shaped, and wherein the forward end of the second biasing component is mounted to the T-shaped bracket.

16. A snow vehicle comprising:

a frame;

a drive motor;

a drive output;

a rear drive system operatively connected to the drive output;

a pair of front skis; and each of the front skis operatively connected to a forward portion of the frame by a front suspension system, the front suspension system including a central pivot defining a generally horizontal pivot axis, the pivot axis oriented generally perpendicular to a longitudinal axis of the frame, the front suspension system arranged to permit each of the front skis to pivot independently about the pivot axis.

17. The snow vehicle of claim 16, wherein each front ski is operatively connected to the central pivot by a pivot hub, each pivot hub connected to the frame by a spring arranged to bias the front ski toward a ground engaging position about the central pivot axis.

18. The snow vehicle of claim 16, wherein each front ski includes a pivot hub mounted to the pivot axis, each pivot hub connected to the front ski by at least one swing arm.

19. The snow vehicle of claim 18, wherein a forward end of each swing arm is connected to a steering hub defining a steering axis, each front ski pivotable about the steering axis.

20. The snow vehicle of claim 19, wherein the steering axis is generally vertical.

21. The snow vehicle of claim 19, wherein the forward end of each swing arm is connected to the steering hub and a rearward end of each swing arm is connected to the pivot hub by a plurality of suspension arms, the suspension arms including at least one inner arm and at least one outer arm.

22. The snow vehicle of claim 16, wherein each front ski includes a pivot hub mounted to the pivot axis, each pivot hub connected to the front ski by at least one swing arm, a forward end of each swing arm connected to a steering hub defining a steering axis, and including a steering mechanism, each of the front skis having a steering link operatively connected to the steering mechanism by a tie rod.

23. The snow vehicle of claim 22, wherein the steering axis of each of the front skis is generally vertical.

24. A snow vehicle comprising:

a frame;

a drive motor;

a drive output;

a drive system operatively connected to the drive output and including a pair of drive tracks having an elongated ground engaging portion, each of the drive tracks connected to the frame by an independent rear suspension assembly, the independent rear suspension assembly arranged to permit the ground engaging portion to pivot relative to the frame about a pair of spaced apart and generally horizontal pivot axes disposed perpendicular to a longitudinal axis of the snow vehicle; and a pair of front skis, each of the front skis connected to the frame by an independent front suspension assembly, the front suspension assembly including a central pivot defining a generally horizontal central pivot axis, the pivot axis oriented generally perpendicular to the longitudinal axis of the snow vehicle, the front suspension system arranged to permit each of the front skis to pivot independently about central pivot axis.

* * * * *